Oct. 23, 1923.
J. CHAPMAN ET AL
1,471,944
SLUICE VALVE
Filed May 6, 1920
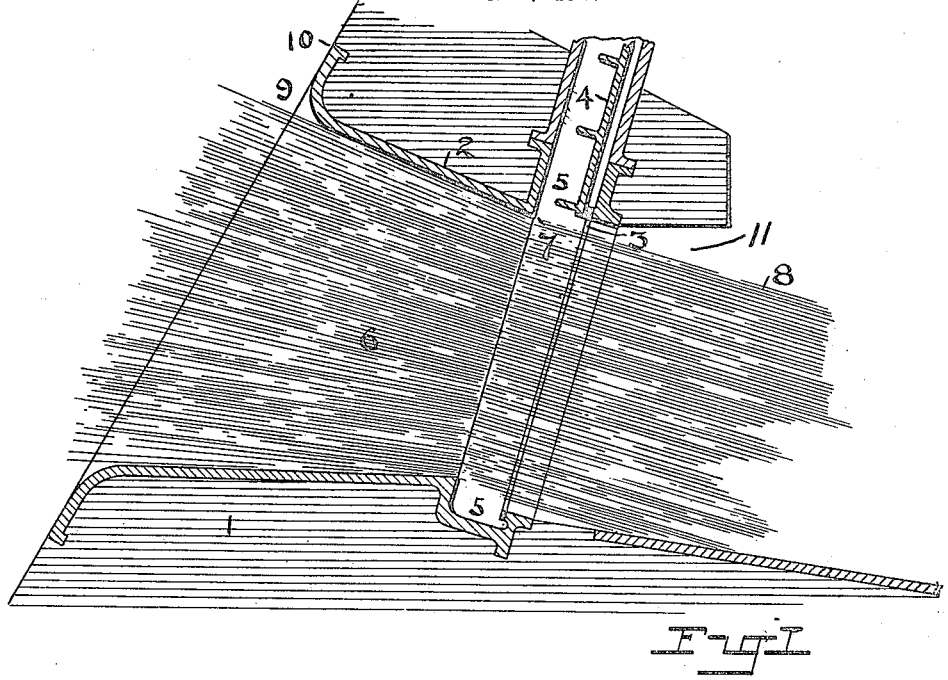
Fig. I
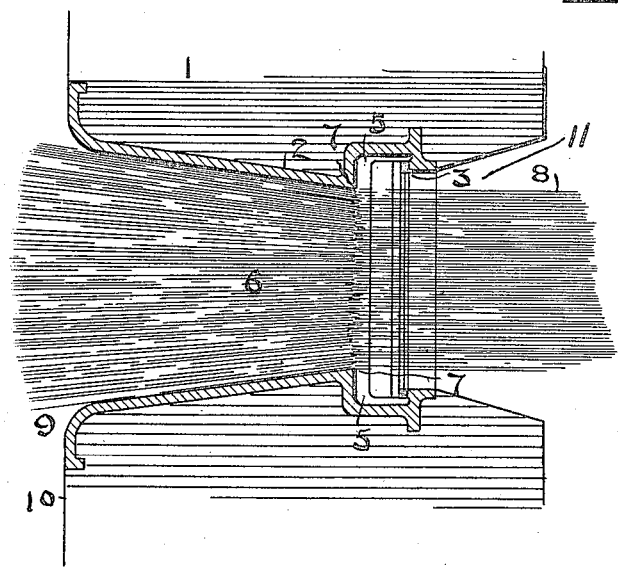
Fig. II
Inventor
James Chapman
and
William Frederick Roger Reynolds
By
Attorney.

Patented Oct. 23, 1923.

1,471,944

UNITED STATES PATENT OFFICE.

JAMES CHAPMAN, OF AUCKLAND PARK, JOHANNESBURG, TRANSVAAL, AND WILLIAM FREDERICK ROGER REYNOLDS, OF JOHANNESBURG, TRANSVAAL, SOUTH AFRICA.

SLUICE VALVE.

Application filed May 6, 1920. Serial No. 379,333.

*To all whom it may concern:*

Be it known that JAMES CHAPMAN and WILLIAM FREDERICK ROGER REYNOLDS, British subjects, residing at Twickenham Avenue, Auckland Park, Johannesburg, and Heath's Hotel, Pritchard Street, Johannesburg, Transvaal Province of the Union of South Africa, respectively, have invented certain new and useful Improvements in Sluice Valves, of which the following is a specification.

The present invention relates to sluice valves for controlling the discharge, from a body of liquid under a head, into the atmosphere, so that the liquid is discharged as a freely flowing jet. It has particular reference to large valves of this kind fitted in conjunction with dams for discharging water therefrom at a considerable depth below the surface and therefore under considerable head.

The invention is illustrated in the accompanying drawings in which—

Fig. I is a sectional elevation and

Fig. II a horizontal section of a portion of a dam wall including the improved valve.

1 indicates a dam wall in which is fitted a valve casing 2. Said valve casing provides a seat 3 for the gate 4, and lateral recesses 5 in which the gate is received when the valve is closed.

In valves of this kind as at present constructed, the flowing water eddies into the recesses 5. Such eddying causes vibration, which, with an outflow of considerable volume and high velocity, is often of such degree as to cause damage to the dam structure. The purpose of the present invention is to provide a valve construction in which this vibration is avoided.

According to the present invention the inlet passage 6 of the valve casing is a nozzle of conical or conoidal form terminating at the recesses 5 in a sharp edged mouth 7 such as to form the outflowing water at the gate aperture as a well defined jet indicated by 8.

The mouth 7 of said nozzle is made of substantially less diameter than the gate recess 5, the seat 3 and any other structures on the outlet side of the valve. The jet is thus discharged without touching or being confined by any such parts, so that eddying and consequent vibration are avoided.

The nozzle 6 is made as short as possible to avoid vibration due to skin friction and to keep the intake orifice 9 of reasonable size in view of the tapered shape of the nozzle. To this end in a thick dam, the valve is positioned at the inner face 10 thereof and then the jet is discharged into a cavity or tunnel 11 within the dam which is large enough not to confine it.

We claim:—

1. A sluice valve for dams, adapted for disposition at the inner face of a dam to discharge water directly into the atmosphere and comprising a gate, a gate recess, and a nozzle formed with an unbroken tapering internal surface leading to said recess and such as to form the out-flowing water into a defined jet which clears the valve structure beyond the nozzle.

2. A sluice valve for dams, adapted for disposition at the inner face of a dam to discharge water directly into the atmosphere and comprising a gate, a gate recess, and a nozzle formed with an unbroken tapering internal surface leading to said recess and terminating at the same in a sharp-edged mouth which is of less diametral dimensions in all directions than the recess, thereby to form the out-flowing water as a defined jet which clears the valve structure beyond said mouth.

3. A sluice valve for dams, adapted for disposition at the inner face of a dam to discharge water directly into the atmosphere and comprising a gate, a gate recess, and a nozzle formed with an unbroken tapering internal surface leading to said recess and terminating thereat in a mouth which is of less diametral dimensions in all directions than the recess, thereby to form the outflowing water as a defined jet which clears the valve structure beyond said mouth; the dam having an outlet passage for the jet which alines with the nozzle and which is of greater diameter than said jet, so that the latter will not be confined by said passage.

In testimony whereof we affix our signatures.

JAMES CHAPMAN.
WILLIAM FREDERICK ROGER REYNOLDS.